US008918845B2

United States Patent
Holmgren et al.

(10) Patent No.: US 8,918,845 B2
(45) Date of Patent: Dec. 23, 2014

(54) METHOD AND ARRANGEMENT FOR MEDIA ACCESS

(75) Inventors: Jimmy Holmgren, Linkoping (SE); Bo Kvarnstrom, Linkoping (SE); Johan Lundgren, Linkoping (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 138 days.

(21) Appl. No.: 13/636,867

(22) PCT Filed: Mar. 23, 2010

(86) PCT No.: PCT/SE2010/050317
§ 371 (c)(1),
(2), (4) Date: Sep. 24, 2012

(87) PCT Pub. No.: WO2011/119076
PCT Pub. Date: Sep. 29, 2011

(65) Prior Publication Data
US 2013/0019288 A1    Jan. 17, 2013

(51) Int. Cl.
*G06F 7/00* (2006.01)
*H04L 29/08* (2006.01)

(52) U.S. Cl.
CPC ....................................... *H04L 67/24* (2013.01)
USPC ............... 726/4; 709/203; 709/206; 709/217; 709/219; 709/223; 709/224; 709/249; 725/46; 455/406; 370/338; 370/404

(58) Field of Classification Search
CPC ........................................................ H04L 67/24
USPC ............... 726/4; 370/338, 401; 709/203, 206, 709/217, 219, 223, 224, 249; 725/46; 705/37; 455/406
See application file for complete search history.

(56) References Cited

U.S. PATENT DOCUMENTS

| 8,484,287 B2 * | 7/2013 | Gavini et al. ................. 709/203 |
| 2006/0239279 A1 * | 10/2006 | Classen et al. ................. 370/401 |

(Continued)

FOREIGN PATENT DOCUMENTS

WO    2008074888 A2    6/2008

OTHER PUBLICATIONS

Heimbigner, "Adapting Publish/Subscribe Middleware to Achieve Gnutella-like Functionality" Technical Report CU-CS-909-00, Sep. 1, 2000, XP002222336, 18 pages.

*Primary Examiner* — Beemnet Dada
*Assistant Examiner* — Sayed Beheshti Shirazi
(74) *Attorney, Agent, or Firm* — Rothwell, Figg, Ernst & Manbeck, P.C.

(57) ABSTRACT

A method and arrangement in a media server (300a) in a first local network (300), of providing remote access to media content stored in a second local network (302). The media server sends a subscription request (3:2) to a presence server (304) for information on media content in the second local network, substantially based on the existing presence service framework. In response thereto, a presence service notification is received (3:3) from the presence server with information referring to remote media content in the second local network that has been published at the presence server. The media server then retrieves (3:4) a content list with available remote media content according to the received presence service notification, and presents (3:5) information from said content list on what media content is available in the second local network, to a device (300c) in the first local network. Thereby, a user of a local device in the first local network can browse and select content from the content list for transfer from the second local network to the first local network.

19 Claims, 4 Drawing Sheets

(56) References Cited

U.S. PATENT DOCUMENTS

| | | | |
|---|---|---|---|
| 2007/0043646 A1* | 2/2007 | Morris | 705/37 |
| 2007/0130158 A1* | 6/2007 | LaBiche et al. | 707/10 |
| 2008/0178198 A1* | 7/2008 | Gauba | 719/320 |
| 2008/0208953 A1* | 8/2008 | Tian | 709/201 |
| 2008/0235090 A1* | 9/2008 | Lundstrom et al. | 705/14 |
| 2008/0279161 A1* | 11/2008 | Stirbu et al. | 370/338 |
| 2009/0144405 A1* | 6/2009 | Tung et al. | 709/223 |
| 2009/0150480 A1* | 6/2009 | Xia et al. | 709/203 |
| 2009/0150481 A1* | 6/2009 | Garcia et al. | 709/203 |
| 2009/0150520 A1* | 6/2009 | Garcia et al. | 709/219 |
| 2009/0150570 A1* | 6/2009 | Tao et al. | 709/249 |
| 2009/0158344 A1* | 6/2009 | Anglin, Jr. | 725/46 |
| 2009/0182821 A1* | 7/2009 | Allen et al. | 709/206 |
| 2009/0193126 A1* | 7/2009 | Agarwal et al. | 709/228 |
| 2011/0053554 A1* | 3/2011 | Wong et al. | 455/406 |
| 2011/0182205 A1* | 7/2011 | Gerdes et al. | 370/254 |
| 2012/0221722 A1* | 8/2012 | Boberg et al. | 709/224 |
| 2013/0007213 A1* | 1/2013 | Ben-Ezra et al. | 709/217 |
| 2013/0097289 A1* | 4/2013 | Alsterlid et al. | 709/219 |

* cited by examiner

METHOD AND ARRANGEMENT FOR MEDIA ACCESS

CROSS REFERENCE TO RELATED APPLICATION(S)

This application is a 35 U.S.C. §371 National Phase Entry Application from PCT/SE2010/050317, filed Mar. 23, 2010, designating the United States, the disclosure of which is incorporated herein in its entirety by reference.

TECHNICAL FIELD

The invention relates generally to a method and arrangement for providing controlled access to media stored in a local network for entities in another opposite local network.

BACKGROUND

Techniques have been developed for multimedia communication involving devices in a limited local network using internal addressing and transport means, which can also be referred to as a private or home network, a LAN (Local Area Network), a residential or office network. In this description, the term "local network" is used to represent any such networks, and the term "device" represents any entity capable of media communication in a local network. The devices in a local network may include any types of entities such as fixed and wireless telephones, computers, media players or "renderers", media servers and television boxes, the latter also called "STB" (Set Top Box).

UPnP (Universal Plug-and-Play) is a technology for establishing standardised device protocols for communication in a local network between different devices that may use different access technologies, operating systems, programming languages, format standards and communication protocols. Further, DLNA (Digital Living Network Alliance) is a technology for acquiring, storing and accessing digital media content in devices of a local network. The UPnP protocol is utilised by DLNA as an underlying protocol for communication between DLNA-enabled devices within local networks. Such DLNA devices are generally capable of using HTTP (Hyper Text Transport Protocol) as a basic transport mechanism for transfer of media in a local network. In addition, RTP (Real Time Protocol) can also be used for media transport in the local network. UPnP supports a process called "discovery" in which a device can join a local network and exchange capabilities and share services with other devices in the network.

A network architecture called IMS (IP Multimedia Subsystem) has been developed as a platform for handling and controlling multimedia services and sessions. In order to provide IMS-based services for devices in a limited local network and to enable multimedia communication with entities outside the local network, a gateway commonly called "HIGA" (Home IMS Gateway) has been devised as a solution where an IMS core is used for establishing sessions with external entities.

A local network typically also has a gateway function for external media transport to and from the local network, often called the "RGW" (Residential Gateway) or "HG" (Home Gateway), the latter being used by the standard organisation HGI (Home gateway Initiative). The HIGA can be regarded basically as an RGW or HG with added IMS functionality. In this description, the term HIGA will be used to represent a gateway with IMS functionality.

UPnP also defines a Remote Access Architecture RAA, enabling a remote UPnP device located outside the local network to communicate with UPnP devices located within the local network. In particular, the RAA specifies how to provision and configure parameters required for enabling remote access connections between entities having a Remote Access Server RAS and a Remote Access Client RAC, respectively, generally referred to as a UPnP RA procedure.

Figure 1:
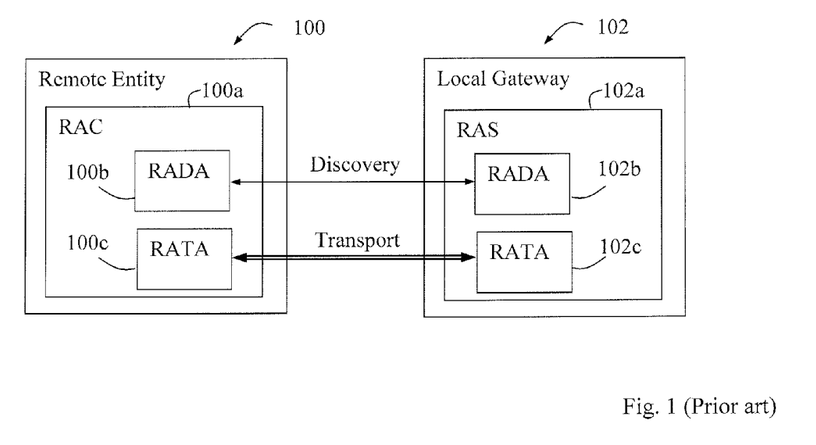
FIG. 1 is a block diagram illustrating a remote entity and a local gateway, configured for remote access to devices in a local network, according to the prior art.

FIG. 1 illustrates a typical logic structure in a remote device 100 and in a local gateway 102 of a local network, respectively, for enabling remote access to local devices in the network (not shown) according to the UPnP RA procedure. The local gateway 102 may be a HIGA, RGW and/or HG. A Remote Access Client "RAC" 100a has been configured in the remote device 100 and a corresponding Remote Access Server "RAS" 102a has been configured in the local gateway 102, which can be done when both are present in the local network since RAC 100a and RAS 102a should be configured and synchronized with matching profiles.

The RAC 100a comprises a Remote Access Discovery Agent "RADA" 100b, and the RAS 102a comprises a corresponding Remote Access Discovery Agent "RADA" 102b, both being configured to exchange discovery or "pairing" messages between the two entities 100 and 102. The RAC 100a further comprises a Remote Access Transport Agent "RATA" 100c and the RAS 102a comprises a corresponding Remote Access Transport Agent "RATA" 102c, both being configured to establish a transport channel for media between the two entities 100 and 102. Effectively, the RATAs 100c, 102c will act as opposite end points for signalling and media communication of the remote access.

Figure 2:
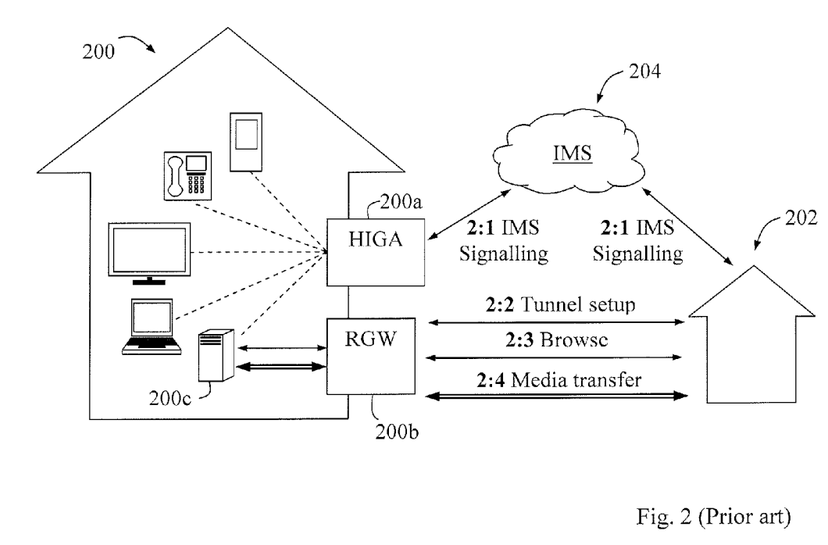
FIG. 2 is a communication overview for media transfer across two local networks, according to the prior art.

In FIG. 2, a local network 200 comprises various different devices in a family residence or an office, in this example including a wireless telephone, a fixed telephone, a TV set, a laptop computer and a media server. The local network 200 also includes a gateway for external communication, in this case including the functions of a HIGA 200a and an RGW 200b, the latter typically having a NAT (Network Address Translation) function and a local DHCP (Dynamic Host Configuration Protocol) server for managing local IP addresses of the devices which are valid only within the local network 200, as is well-known in the art. In practice, the HIGA 106 may be physically integrated in the RGW 102 although logically considered as individual functional units. Further, a media server for storage of media content may also be integrated in the local network gateway which is often denoted a "DMS" (DLNA Media Server) in which a content directory may be maintained for all media content stored in the network.

FIG. 2 also illustrates an opposite local network 202 which has a similar structure and entities as network 200, although not shown in detail here. Techniques have been developed to enable access to media from a remote device or a remote network, such that a device in network 202 can thus remotely access media that is stored in a device at network 200.

According to known solutions, the HIGA 200a performs IMS signalling with a corresponding HIGA or an IMS-enabled device in network 202 over an IMS core 204, as shown by an action 2.1, in order to establish multimedia communication between the two local networks 200, 202. Typically, a VPN (Virtual Private Network) tunnel is set up between RGW 200c and a corresponding entity in network 202, as shown by an action 2:2. Thereby, a user of a device (not shown) in network 202 is able to browse for media content being stored in network 200, e.g. in the shown media server 200c, over the established VPN tunnel, as shown by an action 2:3. If some media content in server 200c is selected by the browsing user in network 202, a session for media transfer over the RGW 200b is executed, as shown by an action 2:4.

However, the known solutions for remote access require that a connection is established between the two local networks, typically a VPN tunnel, before a remote user is able to browse for content in the local network of interest and see what content is available therein. Typically, the browsing can be made in the above-mentioned content directory in a DMS if implemented in the gateway of network 200. This procedure becomes an even greater burden when the user wants to see available content in several local networks, e.g. in the homes of various friends.

Another restriction is that the current solutions for remote access offer access control depending on the accessing device only, such that either all or nothing of the content stored in a local network is made available to a browsing remote device. As a result, the entire media server in a home must be shared with another user, if at all, and selective sharing of only some content is thus not enabled in current solutions. Further, when establishing a connection between devices in two opposite local networks, the risk of collision between local network addresses arises when potentially overlapping private address spaces are used within the networks. There is typically no coordination of address allocation between different local networks, which is commonly handled independently by DHCP servers in the respective networks.

SUMMARY

It is an object of the invention to address at least some of the limitations, problems and issues outlined above. It is also an object to facilitate the process of browsing for remote media content in an opposite local network. It is possible to achieve these objects and others by using a method and an arrangement as defined in the attached independent claims.

According to one aspect, a method is provided in a media server in a first local network, for providing remote access to media content stored in a second local network. In this method, the media server sends a subscription request to a presence server for information on media content in the second local network, substantially based on the existing presence service framework. The media server then receives from the presence server a presence service notification with information referring to remote media content in the second local network that has been published at the presence server.

A content list with available remote media content is then retrieved according to the received presence service notification, and information from the content list on what media content is available in the second local network is presented to a local device in the first local network. Thereby, a user of the device is able to browse and select content from the content list for transfer from the second local network to the first local network.

According to another aspect, an arrangement is provided in a media server in a first local network, configured to provide access to remote media content stored in a second local network. According to this arrangement, the media server comprises a sending module adapted to send a subscription request to a presence server for information on media content in the second local network, substantially based on the existing presence service framework. The media server further comprises a receiving module adapted to receive from the presence server a presence service notification with information referring to remote media content in the second local network that has been published at the presence server.

The media server also comprises a retrieving module adapted to retrieve a content list with available remote media content according to the received presence service notification, and a presenting module adapted to present information from the content list on what media content is available in the second local network, to a device in the first local network.

The above method and arrangement may be configured and implemented according to different embodiments. In one embodiment, the presence service notification includes a URL link that can be used to retrieve the content list, which may be practical if the complete content list is too large to be accommodated in the presence service notification. In that case, the actual content list may be retrieved from a gateway in the second local network or from the presence server, based on the URL link. Alternatively, the presence service notification may include the actual content list, if possible to accommodate.

According to further embodiments, the media content information from the content list can be presented to the device in a content directory when browsing for remote media content, or by broadcasting within the first local network. Furthermore, access control may be applied such that access to view specific media content in the second local network is selectively admitted dependent on the identity of the browsing user. Thereby, it is possible to make only some parts of the content in the second local network available to selected external parties while other parts can be kept private. The owners of the content in the second network are thus free to make any selection of content items available to specifically selected parties, and this solution thus offers great flexibility in that respect.

If the presence server is associated with an IMS core, the latter can be used for authentication and authorization of the browsing user. Thereby, the usually high level of security and privacy of IMS subscriptions for multimedia services can be achieved here as well.

The subscription request may refer to information on media content stored in a group of local networks and/or media content made available by a network operator. The media server of the first local network may also send a publish request to the presence server for making media content in the first network available to other local networks or external entities, basically as of the second network.

Further possible features and benefits of this solution will become apparent from the detailed description below.

BRIEF DESCRIPTION OF DRAWINGS

The invention will now be described in more detail by means of exemplary embodiments and with reference to the accompanying drawings, in which.

DETAILED DESCRIPTION

Briefly described, a solution is provided to enable remote access for devices in one local network by browsing for media content stored in an opposite local network, without requiring that a connection such as a VPN tunnel is established with the opposite network. This connection is only required when media content is actually to be transferred across the two networks after being selected by the browsing user. Thereby, the browsing process is made substantially simpler as compared to prior solutions requiring a VPN tunnel or the like to enable the browsing.

In this solution, the existing framework for presence services is utilised for presenting information on what media content is available in a local network, which information is published at a central presence server and can be viewed and browsed from communicating entities outside the local network, e.g. after being admitted to do so according to an access control function. Thereby, the browsing is made based on published media content information provided from the presence server and does not require a connection between the browsing device and the local network where the content is being stored.

The access control can be applied such that access to specific media content in the network is selectively admitted dependent on the identity of the browsing user. The presence server is preferably associated with an IMS core which can be used for authentication and authorization of the browsing user, although the invention is not limited to using IMS. The content owner can also decide what content to make available from the presence server in this way by selective publishing of media content information at the presence server.

This solution can be implemented as a "virtual media server" in a gateway of the local network in which the browsing user is located. Thus, although the following description and embodiments refer to a media server, its functions described herein could be performed in practice by a local network gateway such as a HIGA.

Figure 3:
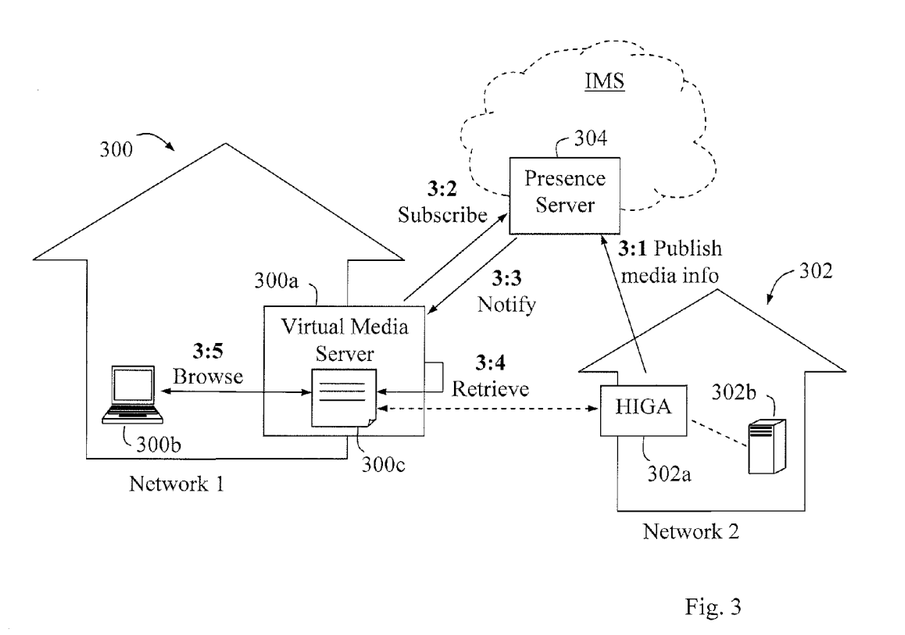
FIG. 3 is a communication overview for media browsing across two local networks, according to an exemplary embodiment.

An exemplary scenario for using this solution will now be described with reference to FIG. 3 illustrating a first local network 300, a second local network 302 and a presence server 304 associated with an IMS core. In this example, the second local network 302 comprises an IMS-enabled gateway function HIGA 302a and a local media server 302b where media content is being stored. Further, a DMS may be configured in the HIGA 302a that holds a content directory with information on media content being stored in the local network 302, including the content in media server 302b.

On the other side, the first local network 300 comprises a "virtual" media server 300a which may reside in a similar IMS-enabled gateway function HIGA, not shown. Network 300 also has a local device 300b connected, in this case a laptop computer, operated by a user who wants to see what media content is available in the opposite local network 302. In this solution, the virtual media server 300a is used to present information on remote media content available from the opposite network 302 to the user during a browsing operation, which information can be maintained in a retrievable content list 300c, as follows. It is an advantage of this solution that the information on remote media content in network 302 can be presented basically in the same way as information on local media content in network 300, and the user may thus be able to browse for both remote and local media content at the same time.

Even though merely two local networks are described in this example, it should be noted that the virtual media server 300a may present information on media content available from any number of local networks, such that the user in network 300 can browse for media in multiple local networks at the same time as well, basically, without having to establish a connection with each and every one of the opposite local networks. Similarly, information on media content being stored in one local network can be made available to more than one other local network or communicating entity using the mechanism described herein.

A first action 3:1 illustrates that the gateway HIGA 302a publishes information on media content being stored in the second local network 302, including the content in media server 302b, by sending a media publish message with presence data, e.g. the SIP PUBLISH message, to the presence server 304, containing the published media content information. Before this action, the HIGA 302a may have received various local SSDP messages from local devices in network 302, e.g. according to regular DLNA procedures, and may maintain a "local content list" or the like of active local devices and their media content, i.e. the content list thus contains an identifier of each content item, e.g. a URI (Universal Resource Identifier), and various metadata related to the media content.

The media publish message sent to the presence server 304 may include the actual local content list, possibly after omitting items not available to users in network 300, or a reference such as a URL (Universal Resource Locator) link, that can be used to retrieve the local content list e.g. from the HIGA 302a in the second local network 302 or from another storage location where the local content list is maintained. The latter alternative of using a URL in the media publish message instead of the actual list may be more practical if the local content list is too large to be included in a SIP PUBLISH message.

The information published in action 3:1 may thus comprise information on all or some of the media content being stored in the second local network 302, and the users in network 302 are thus able to control exactly what content should be published at the presence server 304 or not. The publication of media information as of action 3:1 can also be made selective by publishing different sets of media content, e.g. provided in different content directories, to different local networks or groups of networks. Alternatively or additionally, differentiated access to the content may further be applied at HIGA 302a by admitting media transfer depending on the requesting user or network, e.g. based on an IMPU (IMS Public Identity) in a SIP INVITE message received therefrom.

Further, if such information on content in network 302 has already been published once, any subsequent media publish messages as of action 3:1 may refer to changes and updatings of the content currently available, such as when content is added or removed in the local network 302 or when local devices are connected and disconnected from network 302. The publication of media information as of action 3:1 may thus be executed as a running or continuous process, more or less, basically in the manner of publishing any other client-related presence information.

In a next illustrated action 3:2, the media server 300a, or the network gateway in which the media server resides depending on the implementation, sends a subscription request to the presence server 304 for information on media content in the second local network. The subscription request is naturally triggered by some suitable input by a user in network 300 and may be a SIP SUBSCRIBE message as is common in the presence service framework. Optionally, the subscription request may be configured to be selective by specifying what type of content is wanted/required in the subscription, e.g. "only movies and music but no photographs", or "only content in certain media formats or resolution" (e.g. movies with HD resolution only), and so forth. Still further, the subscription request may refer to information on media content stored in a group of plural local networks and/or any further media content made available by a network operator.

The presence server 304 then responds by sending a presence service notification to the media server 300a or gateway, in a following action 3:3, with information referring to remote media content in the second local network 302 that has been published at the presence server as of action 3:1 above. In this action, access control may be applied at the presence server 304 such that the viewing of specific media content in the second local network is selectively admitted dependent on the subscribing network 300 and/or the identity of the browsing user. In other words, the access control may be configured to admit users in a certain local network or even a certain user to view and access only certain parts of the media content in the second local network.

In the case when the presence server is associated with an IMS core, the latter may be used for authentication and authorization of the subscribing network 300 and/or browsing user taking advantage of existing regular IMS procedures which would provide "telecom grade" security in this respect. The presence service notification in action 3:3 may be a SIP NOTIFY message as is common in the presence service framework.

The presence service notification in action 3:3 may contain a complete content list of media content available in network 302, or the above-mentioned reference, e.g. URL link, that can be used by the subscribing media server 300a to retrieve the content list by downloading from the HIGA 302a or other storage location where the content list is maintained. Analogous with the publish message of action 3.1, providing a URL in the presence service notification instead of the actual list may be more practical if the complete content list is too large to be included in a SIP NOTIFY message. Further, the presence service notification in action 3:3 may refer to changes and updates of previously provided media content information, analogous with action 3.1 above.

A next action 3:4 illustrates schematically that the media server 300a retrieves the content list 300c to make it accessible to local devices in network 300 for browsing. As mentioned above, the media server 300a may receive the actual list in the presence service notification as of action 3:3 which can thereby be directly retrieved in action 3:4. Alternatively, the media server 300a may receive a reference to the content list such as a URL which can be used to download the content list from where is maintained, such as from the HIGA 302a as indicated by the dashed two-way arrow. The content list may also be maintained in and retrieved from the presence server, depending on the implementation.

In a final shown action 3:5, the user triggers device 300b to perform a browsing operation in a local communication with media server 300a which accordingly presents the content list to the user, i.e. as viewed on the used device 300b. According to different possible options, media server 300a may download the list using a URL if received in the notification of action 3:3, either when the user starts to browse or in advance, i.e. the list may be "pre-fetched", to enable faster browsing. Alternatively, the media server 300a may retrieve the list locally if received in the notification of action 3:3. Hence, actions 3:4 and 3:5 may be executed in any order depending on the implementation.

By the above-described procedure, several advantages can be achieved as compared to prior solutions. First, the browsing operation of action 3:5 does not require any connection such as a VPN tunnel between the two local networks 300, 302 which considerably facilitates the sharing of media content across different local networks. Second, media distribution from an operator or content provider can also be facilitated since it is not necessary to distribute the media to all potential consumers separately.

Third, the above-mentioned problem of local address collisions during the browsing operation is neatly avoided since the browsing is made by means of content information provided by the presence server instead. Fourth, this solution can provide great flexibility by enabling detailed access control and selective sharing of media content in a simple manner, and also refined subscriptions in terms of what type of media is subscribed to.

This solution further enables content sharing across plural local networks forming a community containing friends with whom the content is shared. To accomplish this, a list with identities of friends can be created, including address information for each friend's CHG DMS. One way to solve this is to use IMS identities, IMPU:s, and to use the IMS core to find each friend's CHG DMS. Other mechanisms are also possible, e.g. using a mutually shared identity and routing by means of a dynamic DNS (Domain Name Server). In an IMS-based system, this can be accomplished as a presence group, containing all users in the collaboration community. Content updates are signalled to all in the group using IMS presence messages. For each of the friends in the collaboration community, access control can also be defined, i.e. information on what content should be available to this friend.

Figure 4:
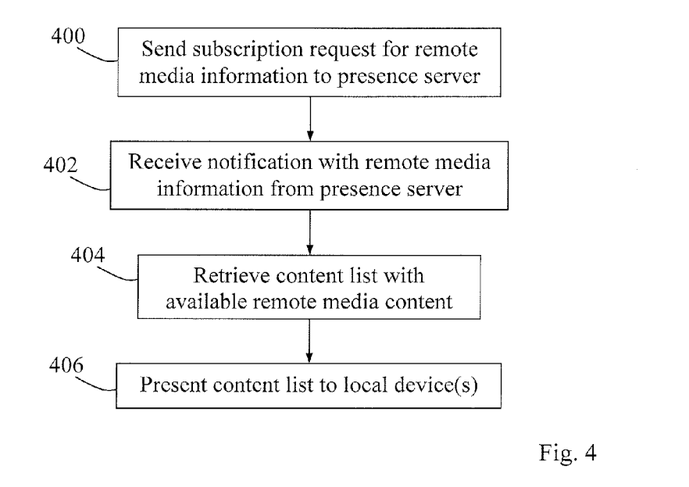
FIG. 4 is a flow chart with steps performed by a media server, according to another exemplary embodiment.

A procedure, performed by a media server in a first local network, for providing remote access to media content stored in a second local network, will now be described with reference to the flow chart in FIG. 4 comprising steps basically executed by the media server. In practice, the media server may be implemented in a gateway of the first local network, such as a HIGA, RGW or HG, and in that case the steps in FIG. 4 may be technically executed by the gateway. Further, the media server of FIG. 4 may act basically as the server 300a of FIG. 3.

In a first step 400, the media server sends a subscription request to a presence server for information on remote media content in the second local network, substantially based on the existing presence service framework. As mentioned above, the subscription request may be selective with respect to the type of media desired/required. A next step 402 illustrates that the media server receives a presence service notification from the presence server, which contains information referring to remote media content in the second local network that has been published at the presence server.

Thus, a media server or gateway in the second local network has previously published information on at least some of the media content being stored in the second local network. The media content information in the presence service notification may contain a complete list of available media content or a reference thereto, e.g. a URL link that can be used to download the content list, as described above. The content list may include URI:s identifying the content items in the list.

As described above for action 3:1, users in the second local network may decide what content to make available by means of this presence-based solution. Further, the available media content in the second local network may be changed and updated from time to time, such as when content is added or removed in the local devices, or when local devices are connected and disconnected from the network. Furthermore, the media server in the first local network may also likewise publish information on media content being stored in the first local network, by sending a publish request to the presence server for making the media content in the first network, or selected parts thereof, available to other local networks or external entities, e.g. the second local network. Hence, this solution can be employed both ways.

In a further step 404, the media server retrieves the above content list with available remote media content according to the received presence service notification, either locally if received with the presence service notification in step 402, or by downloading by means of a URL link received with the presence service notification. Finally, information from the content list on what media content is available in the second local network, is presented to a device in the first local network, as shown in a last step 406. Thereby, a user of a local device in the first local network is able to browse and select content from the content list for transfer from the second local network to the first local network.

The information from the content list may be presented to the device in a content directory when browsing for remote media content, or by broadcasting within the first local network. Any conventional process may be used for transferring selected content from the second local network to the first local network, which is somewhat outside the scope of this invention and therefore not necessary to describe here in any detail.

Figure 5:
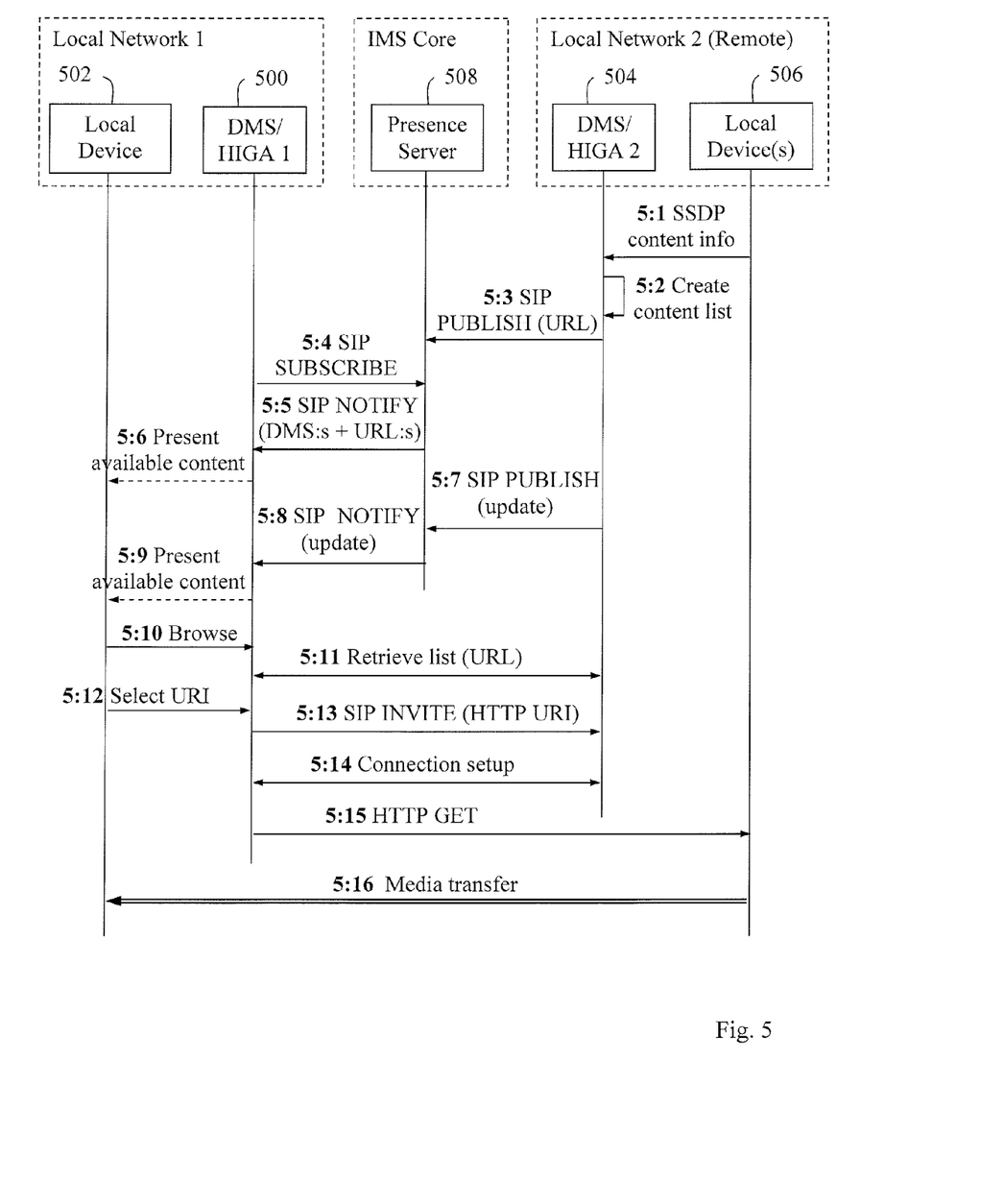
FIG. 5 is a signalling diagram illustrating an example of how the invention can be put into practice, according to further exemplary embodiments.

An example of how the inventive solution can be implemented in practice will now be described with reference to the signalling diagram in FIG. 5. In this example, procedures and protocols according to SIP, UPnP and DLNA are used and the following nodes and entities are involved: a DMS 500 implemented in a HIGA of a first local network "1", a local device 502 in network 1, a DMS 504 implemented in a HIGA of a second local network "2", one or more local devices 506 in network 2, and a central presence server 508 associated with an IMS core.

The procedure in FIG. 5 will now be described in terms of different schematic steps or actions, each of which may represent one or more specific functions and messages transferred back and forth depending on the protocols used. As can be appreciated by a skilled person, each shown SIP message is typically followed by the common response message "SIP 200 OK", although not shown here for simplicity. It is assumed that a user of device 502 in network 1 is interested in what media content is available in network 2 as being stored in devices 506, which could include a media server as in the example of FIG. 3. A first action 5:1 illustrates that the DMS 504 collects information on what media content is stored in the local devices 506 in network 2 by means of local SSDP messages according to regular procedures.

A next action 5:2 illustrates that the DMS 504 creates a local content list, e.g. configured as a content directory, containing information on what media content is stored locally in network 2. As mentioned above, each item in the content list may be identified by a URI which can be used later for fetching the actual content from the local network. In this action, DMS 504 may also apply selective access control, e.g. by creating different content lists for different networks or users. DMS 504 then sends a SIP PUBLISH message to the presence server 508, in an action 5:3, which includes a URL that can be used by external parties to download the created content list. If different content lists have been created for different networks or users, each list may have a separate URL. Alternatively, DMS 504 may send the complete content list to server 508, i.e. without the URL link, if not too large to be accommodated in the SIP PUBLISH message.

At some point later, a SIP SUBSCRIBE message is sent from the DMS 500 in network 1 to the presence server 508, in a next action 5:4, effectively requesting a presence service subscription for information on what media content in network 2 is available to users in network 1. In this example, the subscription request refers to more than one local network, i.e. a group of local networks including the shown network 2.

As mentioned above, the network references in the subscription request may be IMPU:s used by the networks' DMS:s. In response thereto, DMS 500 receives a SIP NOTIFY message as a presence service notification from the presence server 508, in a further action 5:5, which contains information referring to remote media content in the subscribed local networks that has been published by the networks at the presence server, including network 2. The notification thus comprises references to currently available DMS:s of the subscribed local networks and corresponding URL:s pointing to content lists of respective local networks.

An optional action 5:6 illustrates that DMS 500 may at this point present information on the available content in the local networks to the local devices in network 1 by broadcasting. A further action 5:7 illustrates that when the local content list in DMS 504 has changed, DMS 504 sends an update SIP PUBLISH message to presence server 508 in order to update the previously published media content information as the availability of media content has changed in some way, e.g. when content has been added, modified or removed, or when a device has been connected or disconnected to network 2.

Another action 5:8 illustrates that presence server 508 sends a corresponding update SIP NOTIFY message to DMS 500 indicating the changed availability of media content. Basically, an update SIP NOTIFY message may be sent every time a new DMS becomes available, a DMS is removed or whenever the content list is changed in a DMS. At each update, the DMS 500 may present information on content changes to the local devices in network 1 by broadcasting, as shown by another optional action 5:9. Thus, actions 5:7-5:9 may be repeated at any time whenever updatings occur. In the broadcasting actions 5:6 and 5:9, the DMS 500 basically converts the received SIP NOTIFY into appropriate UPnP messages which are broadcasted to all local devices in network 1.

Next, the user of device 502 in network 1 at some point initiates a browsing operation in an action 5:10, and in this example the DMS 500 then retrieves the content list from DMS 504 in the opposite network 2 by means of the URL received in action 5:5 above, as shown by a further action 5:11. As mentioned in connection with FIG. 3, media server 300a may instead download and "pre-fetch" the list at some point in advance, as soon as the URL is received in action 5:5. The content list is duly presented to device 502 in the browsing operation, e.g. in a local content directory that comprises content both in network 1 and in the remote network 2. The user may then select a content item from the list, as identified by a URI, in a further action 5:12, effectively ordering a transfer of the media content from network 2 to network 1.

In response thereto, DMS 500 sends a SIP INVITE message in a control plane over the IMS core to the opposite DMS 504 in network 2, in an action 5:13, which is basically a session invitation referring to an offered session description with address and media profile information needed to set up a HTTP session, including an HTTP URI that describes which URI that the originating DMS 500 wants to retrieve from network 2. If the session invitation is accepted, DMS 504 responds to DMS 500 with a SIP 200 OK message, not shown.

A media session can now be set up by means of regular remote access procedures. Thus, a connection such as a VPN tunnel is established as a media plane between a HTTP proxy in DMS 500 and a HTTP proxy in DMS 504, in an action 5:14. Through this media plane connection, DMS 500 sends a HTTP GET message to DMS 504, in an action 5:15, referring to the selected URI pointing to media content being stored in one of the local devices 506 in network 2. Finally, the selected media content item can be transferred from the local device 506, where it is being stored, to the local device 502 in network 1, as schematically illustrated by a last action 5:16.

An arrangement in a media server will now be described in more detail with reference to the block diagram of FIG. 6. The media server 600 may be used to accomplish any of the above-described procedures and embodiments. The various functions therein are called "modules" in this description, although they could also be seen as units, blocks, elements or components. The media server 600 is located in a first local network, and is configured to provide access to remote media content stored in a second local network.

The media server 600 comprises a sending module 600*a* adapted to send a subscription request "S" to a presence server 602 for information on media content in the second local network, substantially based on the existing presence service framework. Server 600 further comprises a receiving module 600*b* adapted to receive from the presence server 602 a presence service notification "N" with information referring to remote media content in the second local network that has been published "P1" at the presence server.

Server 600 also comprises a retrieving module 600*c* adapted to retrieve a content list "L" with available remote media content according to the received presence service notification, and a presenting module 600*d* adapted to present information from the content list on what media content is available in the second local network, to one or more devices 604 in the first local network. Thereby, a user of a local device 604 in the first local network is able to browse and select content from the content list for transfer from the second local network to the first local network.

According to some exemplary embodiments, the retrieving module 600*c* may be further adapted to retrieve the content list from a gateway in the second local network or from the presence server 602, based on a URL if included in the presence service notification. The retrieving module may also be adapted to retrieve the complete content list if included in the presence service notification. The presenting module 600*d* may be further adapted to present the media content information from the content list to the device either in a content directory when the device is browsing for remote media content or by broadcasting within the first local network.

The media server 600 may be further configured to apply access control such that access to specific media content in the second local network is selectively admitted dependent on the identity of the browsing user. The subscription request may refer to information on media content stored in a group of local networks and/or media content made available by a network operator. The media server 600 may be further configured to send a publish request "P2" to the presence server 602 for making media content in the first network available to other local networks or external entities. This solution can thus be used in both directions.

The media server 600 can be configured to operate basically as described in the previous examples. The above functions in the media server are configured to basically comply with the existing presence framework, and may further be configured to use regular UPnP and DLNA procedures, or any other equivalent or similar standards and protocols that can be utilised in a novel way for implementing the invention, as described herein.

Figure 6:
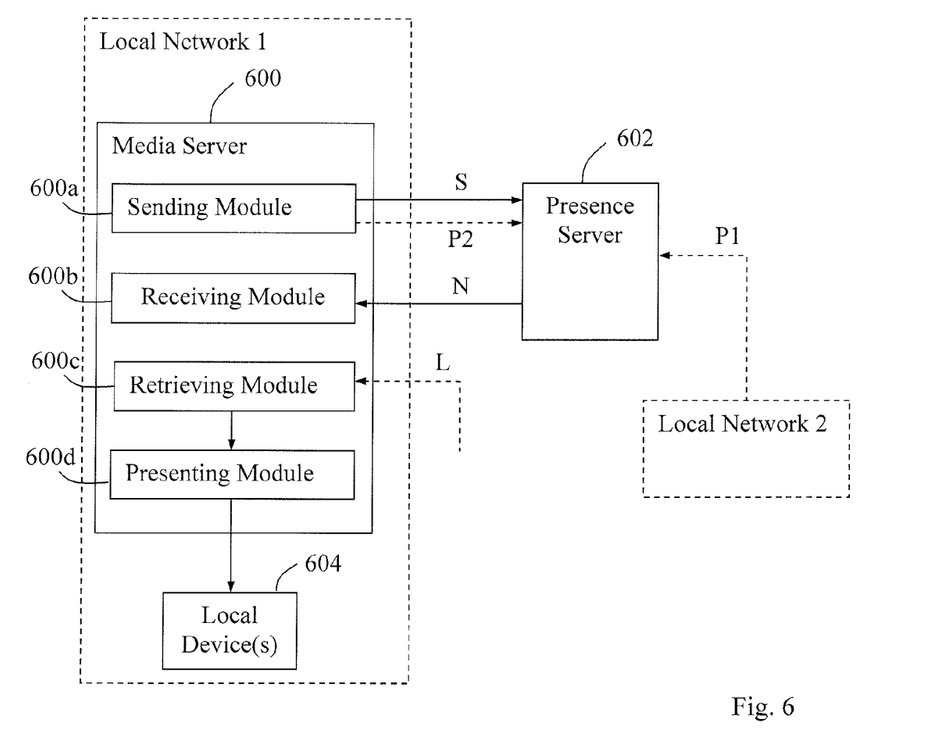
FIG. 6 is a block diagram illustrating in more detail an arrangement in a media server, according to further exemplary embodiments.

It should be noted that FIG. 6 merely illustrates various functional units or modules in the media server 600 in a logical sense, although the skilled person is free to implement these functions in practice using suitable software and hardware means. Thus, the invention is generally not limited to the shown structures of the media server 600, while its functional modules 600*a-d* may be configured to operate according to the methods and procedures described above for FIGS. 3-5, where appropriate.

While the invention has been described with reference to specific exemplary embodiments, the description is generally only intended to illustrate the inventive concept and should not be taken as limiting the scope of the invention. For example, the terms "device", "media server", "gateway", "URL", "URI" and "presence" have been used throughout this description, although any other corresponding functions, parameters, nodes and/or units may be used having the functionalities and characteristics described here. Further, the concepts of UPnP, DLNA, IMS and SIP have also been used when describing the above embodiments, but any other similar or equivalent standards, protocols and network elements may basically be used as described herein. The invention is defined by the appended claims.

The invention claimed is:

1. A method performed in a media server in a first local network for providing remote access to media content stored in a second local network, comprising:
   the media server sending a subscription request to a presence server for information on media content in the second local network;
   the media server receiving from the presence server a presence service notification including information referring to remote media content in the second local network that has been published at the presence server;
   the media server retrieving a content list including available remote media content according to the received presence service notification, wherein the content list is retrieved from a gateway in the second local network or from said presence server, based on a URL link; and
   the media server presenting information to a local device in the first local network from said content list, said information including media content that is available in the second local network;
   wherein: a user of said device in the first local network is enabled to select content from the content list, wherein the selected content is transferred from the second local network to the first local network,
   at least one device in the second local network browses the media content without a connection using a virtual private network (VPN), and
   the content list is provided in a browsing operation and is associated with a local content directory that comprises content from both the first local network and the second local network.

2. The method according to claim 1, wherein the presence service notification includes the URL link that can be used to retrieve said content list.

3. The method according to claim 1, wherein the presence service notification includes said content list.

4. The method according to claim 1, wherein said media content information from the content list is presented to the device in a content directory when browsing for remote media content.

5. The method according to claim 1, wherein the media content information from said content list is presented to the device by broadcasting within the first local network.

6. The method according to claim 1, wherein access control is applied such that access to specific media content in the second local network is selectively admitted dependent on one or more of the subscribing network and the identity of the browsing user.

7. The method according to claim 1, wherein the presence server is associated with an IMS core.

8. The method according to claim 7, wherein the IMS core is used for authentication and authorization of the browsing user.

9. The method according to claim 1, wherein said subscription request refers to information on one or more of media content stored in a group of local networks and media content made available by a network operator.

10. The method according to claim 1, wherein a publish request is sent to said presence server for making media content in the first network available to other local networks or external entities.

11. A media server in a first local network, configured to provide access to remote media content stored in a second local network, wherein the media server comprises:
a memory;
a processor coupled to the memory, wherein the processor includes:
  a sending module that sends a subscription request to a presence server for information on media content in the second local network;
  a receiving module that receives from the presence server a presence service notification including information referring to remote media content in the second local network that has been published at the presence server;
  a retrieving module that retrieves a content list including available remote media content according to the received presence service notification, wherein the retrieving module is further configured to retrieve the content list from a gateway in the second local network or from said presence server, based on a URL link; and
  a presenting module that presents information from said content list on what media content is available in the second local network, to a local device in the first local network; wherein:
  enabling a user of said device in the first local network to select content from the content list and to transfer selected content from the second local network to the first local network wherein selected content is transferred from the second local network to the first local network,
  at least one device in the second local network browses the media content without a connection using a virtual private network (VPN), and
  the content list is provided in a browsing operation and is associated with a local content directory that comprises content from both the first local network and the second local network.

12. The media server according to claim 11, wherein the presence service notification includes the URL link that can be used to retrieve said content list.

13. The media server according to claim 11, wherein the retrieving module is further configured to retrieve said content list being included in the presence service notification.

14. The media server according to claim 11, wherein the presenting module is further configured to present said media content information from the content list to the device in a content directory when the device is browsing for remote media content.

15. The media server according to claim 11, wherein the presenting module is further configured to present the media content information from said content list to the device by broadcasting within the first local network.

16. The media server according to claim 11, further configured to apply access control such that access to specific media content in the second local network is selectively admitted dependent on one or more of the subscribing network and the identity of the browsing user.

17. The media server according to claim 11, wherein said subscription request refers to information on one or more of media content stored in a group of local networks and media content made available by a network operator.

18. The media server according to claim 11, further configured to send a publish request to said presence server for making media content in the first network available to other local networks or external entities.

19. The method of claim 1, wherein the presence service notification is a SIP NOTIFY message.

* * * * *